(12) United States Patent
Altin et al.

(10) Patent No.: US 9,323,436 B2
(45) Date of Patent: Apr. 26, 2016

(54) UTILIZING DRAWING GUIDES IN DETERMINING THE DISPLAY OF SMART GUIDES IN A DRAWING PROGRAM

(75) Inventors: Daniel John Altin, San Francisco, CA (US); Ankit Prasad, Palo Alto, CA (US); Hannes Ruescher, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/439,881

(22) Filed: Apr. 5, 2012

(65) Prior Publication Data

US 2013/0268854 A1 Oct. 10, 2013

(51) Int. Cl.
G06F 3/00 (2006.01)
G06F 3/0484 (2013.01)
G06T 11/60 (2006.01)

(52) U.S. Cl.
CPC ............ *G06F 3/04845* (2013.01); *G06T 11/60* (2013.01); *G06T 2200/24* (2013.01)

(58) Field of Classification Search
USPC .................. 715/708, 228, 211, 244, 801, 858
See application file for complete search history.

(56) References Cited

U.S. PATENT DOCUMENTS

| | | | |
|---|---|---|---|
| 5,299,307 A | 3/1994 | Young | |
| 5,745,099 A | 4/1998 | Blomqvist | |
| 5,774,111 A | 6/1998 | Lecland et al. | |
| 5,798,761 A | 8/1998 | Isaacs | |
| 5,883,636 A | 3/1999 | Hayashi et al. | |
| 5,894,310 A | 4/1999 | Arsenault et al. | |
| 6,065,021 A | 5/2000 | George | |
| 6,568,938 B1 | 5/2003 | Prince et al. | |
| 7,123,259 B2 | 10/2006 | Cabral et al. | |
| 7,467,351 B1 | 12/2008 | Spells et al. | |
| 7,545,392 B2 | 6/2009 | Sprang et al. | |
| 7,589,750 B1 | 9/2009 | Stratton | |
| 7,614,000 B2 | 11/2009 | Villaron et al. | |
| 7,751,623 B1 | 7/2010 | Simmons et al. | |
| 2002/0140736 A1 | 10/2002 | Chen | |
| 2004/0239691 A1* | 12/2004 | Sprang et al. ................. | 345/651 |

(Continued)

FOREIGN PATENT DOCUMENTS

| | | |
|---|---|---|
| CN | 1677343 A | 10/2005 |
| CN | 1838071 A | 9/2006 |

(Continued)

OTHER PUBLICATIONS

Ruben Olsen, OmniGraffle 5 Diagramming Essentials, Oct. 2010.*

(Continued)

*Primary Examiner* — Linh K Pham
*Assistant Examiner* — Tam Tran
(74) *Attorney, Agent, or Firm* — Julie Kane Akhter; Tom Wong; Micky Minhas (57) ABSTRACT

Technologies are described herein for utilizing drawing guides in determining the display of smart guides in a drawing program. The drawing program detects that an active drawing object is being manipulated on a drawing canvas. The drawing program determines if one or more drawing guides are visible on the drawing canvas. Upon determining that one or more drawing guides are visible on the drawing canvas, the drawing program treats the drawing guides as drawing objects in determining the display of smart guides on the drawing canvas and the snap-to positioning of the active drawing object.

15 Claims, 7 Drawing Sheets

(56) References Cited

U.S. PATENT DOCUMENTS

| | | | |
|---|---|---|---|
| 2005/0068290 | A1 | 3/2005 | Jaeger |
| 2006/0008779 | A1 | 1/2006 | Shand et al. |
| 2006/0259872 | A1* | 11/2006 | Mullen et al. ................. 715/764 |
| 2006/0259875 | A1 | 11/2006 | Collins et al. |
| 2006/0282759 | A1 | 12/2006 | Collins et al. |
| 2009/0217187 | A1 | 8/2009 | Kendall et al. |
| 2009/0217206 | A1 | 8/2009 | Liu et al. |
| 2010/0020101 | A1 | 1/2010 | Schormann |
| 2010/0218100 | A1 | 8/2010 | Simon et al. |
| 2011/0050686 | A1 | 3/2011 | Nojima et al. |
| 2013/0050264 | A1 | 2/2013 | Prasad et al. |
| 2013/0106917 | A1 | 5/2013 | Altin et al. |
| 2013/0145305 | A1* | 6/2013 | Maloney et al. .............. 715/781 |
| 2013/0268854 | A1 | 10/2013 | Altin et al. |
| 2015/0199202 | A1 | 7/2015 | Altin |

FOREIGN PATENT DOCUMENTS

| | | |
|---|---|---|
| CN | 101194504 | 6/2008 |
| CN | 102105850 A | 6/2011 |
| TW | 200901019 | 1/2009 |
| WO | WO2008076079 | 6/2008 |

OTHER PUBLICATIONS

Kaushik Patowary, "User Drawing Guides to Align Objects in PowerPoint," Jun. 11, 2011.*
Cari Jansen, "When smart guides turn blue . . . ," Apr. 26, 2011.*
Doughlas Shue et al., "Technique in Java for drawing lines between Components within Panel", Oct. 1, 1999, pp. 1-4.*
Authors et al., "A method for graphical placement of objects on a canvas controlled by user recommendations", Apr. 17, 2007, p. 1 of 18.*
Chinese Office Action mailed Dec. 12, 2014 for Chinese patent application No. 201210514597.2, a counterpart foreign application of U.S. Appl. No. 13/310,801, 12 pages.
Chinese Office Action mailed Sep. 25, 2015 for Chinese patent application No. 201210313094.9, a counterpart foreign application of U.S. Appl. No. 13/220,725, 8 pages.
"Microsoft PowerPoint 2010 Product Guide", Retrieved at <<http://download.microsoft.com/download/7/1/6/71629716-1715-414B-87D5-298633009207/Microsoft%20PowerPoint%202010%20Product%20Guide_Final.docx>>, Retrieved Date: Jan. 30, 2012, pp. 82.
Cohen, Sandee, "Align and Space Objects with InDesign's Smart Guides", Retrieved at <<http://www.creativepro.com/article/align-and-space-objects-indesigns-smart-guides>>, Dec. 11, 2011, pp. 10.
"The Power of Smart Guides", Retrieved at <<http://vectips.com/tips-and-tricks/the-power-of-smart-guides/>>, Mar. 31, 2010, pp. 20.
Blatner, David, "Building an Org Chart or Flowchart in InDesign, Part 2", Retrieved at <<http://indesignsecrets.com/building-an-org-chart-or-flowchart-in-indesign-part-2.php>>, Oct. 28, 2010, pp. 10.
"Ruler guides", Retrieved at <<http://help.adobe.com/en_US/InDesign/6.0/WSfd1234e1c4b69f30d2a5051004d659b1c-7fefa.html#WSa285fff53dea4f8617383751001ea8cb3f-7126a>>, Retrieved Date: Jan. 30, 2012, pp. 9.
Watkins, Craig, "Rulers, Grids & Guides", Retrieved at <<http://www.illustratortips.com/index.php/Instruction/Beginner-Tips/rulers-grids-a-guides.html>>, Retrieved Date: Jan. 30, 2012, pp. 8.
"Differentiating Between Editable and Uneditable Guides", Filed Date: Dec. 5, 2011, U.S. Appl. No. 13/310,801, pp. 33. (MS# 334400.01), Inventors: Maloney et al.
"Determining the Display of Equal Spacing Guides Between Diagram Shapes", Filed Date: Aug. 30, 2011, U.S. Appl. No. 13/220,725, pp. 27. (MS# 333200.01) Inventors: Prasad et al.
U.S. Official Action dated Jul. 2, 2014 in U.S. Appl. No. 13/220,725.
U.S. Official Action dated Oct. 24, 2014 in U.S. Appl. No. 13/220,725.
U.S. Official Action dated Oct. 23, 2014 in U.S. Appl. No. 13/301,801.

Olsen, Ruben, "Chapter 6: Making your Diagram Look Good," Oct. 2010. OmniGraffle 5 Diagramming Essentials, 47 pages.
Chinese Official Action dated Nov. 5, 2014 in Chinese Application No. CN 201210313094.9.
U.S. Official Action dated May 22, 2014 in U.S. Appl. No. 13/310,801.
Jansen, Carl "When smart guides turn blue . . . ," Published on: Apr. 26, 2011, Available at: http://indesignsecrets.com/when-smart-guides-turn-blue.php, 6pp.
"Basic Shapes Development," Published on: Oct. 2000, Available at , 13 pp.
Grossbart et al., "Nearest Neighbor Analysis," 1978, *Advances in Consumer Research*, vol. 5, pp. 114-118.
Hunt, Paul "Photoshop Elements, Grids," Published on: Oct. 18, 2010, Available at: http://www.phtokaboom.com/photography/learn/photoshop_elements/grids/1_make_grid.htm, 4 pp.
"Help/Adobe/Using inDesign CS5/Layout Ruler Guides," Published on: Jun. 13, 2010, Available at: http://help.adobe.com, 4pp.
"DTP Tools Help> Plug-ins for InDesign/InCopy> Layer Groups" Published on: Nov. 2, 2009, 1 pg.
"How to implement a basic action listener in InDesign," Published on: Nov. 22, 2011, 4 pp.
"Selecting objects with selection tools," Published on: Jan. 1, 2010, In: Canvas 12. User Guide, ACD Systems of America, p. 160, 4 pp.
"Aligning and distributing objects," Published on: Nov. 30, 2011, Available at: http://help/adobe.com/en_US/indesign/cs/using/WS40FBD15DA9F9-4f1c-9DF9-6A673EC4C172a.html, 5 pp.
"Activinspire in the ActivClassroom," Published on: Nov. 30, 2011, Available at: http://www.prometheanplanet.com/documents/uk-us/pdf/support/user-guides-docs/activinspire/activinspire-in-the-activclassroom.pdf, 36 pp.
"Layers," Published on: Dec. 1, 2011, Available at: http://help.adobe.com/en_US/InDesign/6.0/WSa285fff53dea4f8617383751001ea8cb3f-70e8a.html, 8 pp.
European Search Report dated Mar. 15, 2013 in European Application No. 12195574.4.
U.S. Official Action dated Mar. 12, 2014 in U.S. Appl. No. 13/220,725.
U.S. Official Action dated Oct. 4, 2013 in U.S. Appl. No. 13/310,801.
"Alignment Using Drawing Guides on a PowerPoint Slide", Published on: Sep. 1, 2011, Available at http://www.aspirecommunications.com/newsletter-design-alignment-using-drawing-guides.html, pp. 2.
"Office Action Issued in Chinese Patent Application No. 201210424635.5", Mailed Date: Aug. 20, 2014, 10 Pages. (MS# 334070.02).
Chiense Office Action mailed Dcember 12, 2014 for Chiense patent application No. 201210514597.2, a counterpart foreign application of U.S. Appl. No. 13/310,801, 12 pages.
"Inkscape Interface", Published on: Sep. 1, 2011, Available at: http://en.flossmanuals.net/inkscape/ch003_the-inkscape-interface, pp. 6.
Johnson, S. "Working with Guides, Grid & Slices", Published on: Dec. 15, 2008, Available at: http://www.informit.com/articles/article.aspx?p=1312599&seqNum=8, pp. 2.
Lechat, F., "How to Add Guides in PowerPoint", Published on: Oct. 5, 2010, Available at http://www.ehow.com/how_7289659_addguides-powerpoint.html, pp. 4.
Notice of Allowance for U.S. Appl. No. 13/13/285,010, mailed on Jun. 9, 2014.
"Preparation of Flow Cytometry Figures Using FlowJo and Canvas", Published on: Sep. 1, 2011, Available at: http://www.microbiology.emory.edu/altman/f_protocols/f_flowCytometry/flowFigures_p2.html, pp. 11.
Zhang, Xinkui, "Fully use of alignment and layout function of Photoshop," Computer Knowledge and Technology, 2007, Issue 7, 3 pages.
Translated Chinese Office Action mailed Apr. 9, 2015 for Chinese patent application No. 201210313094.9, a counterpart foreign application of U.S. Appl. No. 13/220,725, 8 pages.

\* cited by examiner

UTILIZING DRAWING GUIDES IN DETERMINING THE DISPLAY OF SMART GUIDES IN A DRAWING PROGRAM

BACKGROUND

A drawing program may include various "guides" that assist a user in positioning drawing objects, such as shapes, lines, images, text, and the like, on a drawing canvas. These guides may comprise non-printing elements, such as horizontal and vertical lines, alignment indicators, spacing indicators, and the like, that may be used to visually align and space objects on the drawing canvas. The guides utilized by drawing programs may include drawing guides and "smart guides."

Drawing guides may be stationary guides that run the length/width of the drawing canvas and provide a visual reference for the alignment of shapes and other drawing objects. Drawing guides may be strategically placed on the drawing canvas by a user or a template designer to achieve a specific design goal. There may be multiple drawing guides, both vertical and horizontal. When drawing objects are placed or repositioned on the drawing canvas containing drawing guides, the objects may "snap" an edge to these guides when dragged within a threshold of a few pixels of the guide. Smart guides, in contrast, may only appear when two or more drawing objects are in alignment with each other or when equidistant spacing between objects is achieved. In addition, the drawing object being placed or moved may snap to a position of alignment or equidistant spacing as indicated by the smart guide. Typically, a drawing application may only show smart guides on the drawing canvas between the various drawing objects and independent of any drawing guides that may exist on the drawing canvas.

It is with respect to these considerations and others that the disclosure made herein is presented.

SUMMARY

Technologies are described herein for utilizing drawing guides in determining the display of smart guides in a drawing program. Utilizing the technologies described herein, a drawing program may consider what drawing guides exist and/or are visible on the drawing canvas when determining when and where to display smart guides and how they assist the user in the placement and alignment of drawing objects on the drawing canvas. The drawing guides may essentially be treated as other drawing objects for the determination of the display of smart guides and "snap-to" positioning of drawing objects. This may result in smart guides, such as equal spacing smart guides, being displayed between a drawing object and a drawing guide as well as between other drawing objects on the drawing canvas. This may also provide for other alignment options for drawing objects in regard to drawing guides beyond the traditional "edge snap," such as by allowing drawing objects to snap to a center alignment with a drawing guide, for example.

According to embodiments, a drawing program detects that an active drawing object is being manipulated on a drawing canvas. The drawing program determines if one or more drawing guides exist on the drawing canvas. Upon determining that one or more drawing guides exist on the drawing canvas, the drawing program treats the drawing guides as drawing objects in determining the display of smart guides on the drawing canvas and snap-to positioning of the active drawing object.

It will be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for utilizing drawing guides in determining the display of smart guides in a drawing program. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, distributed systems, and the like.

In the following detailed description, references are made to the accompanying drawings that form a part hereof and that show, by way of illustration, specific embodiments or examples. In the accompanying drawings, like numerals represent like elements through the several figures.

Figure 1:
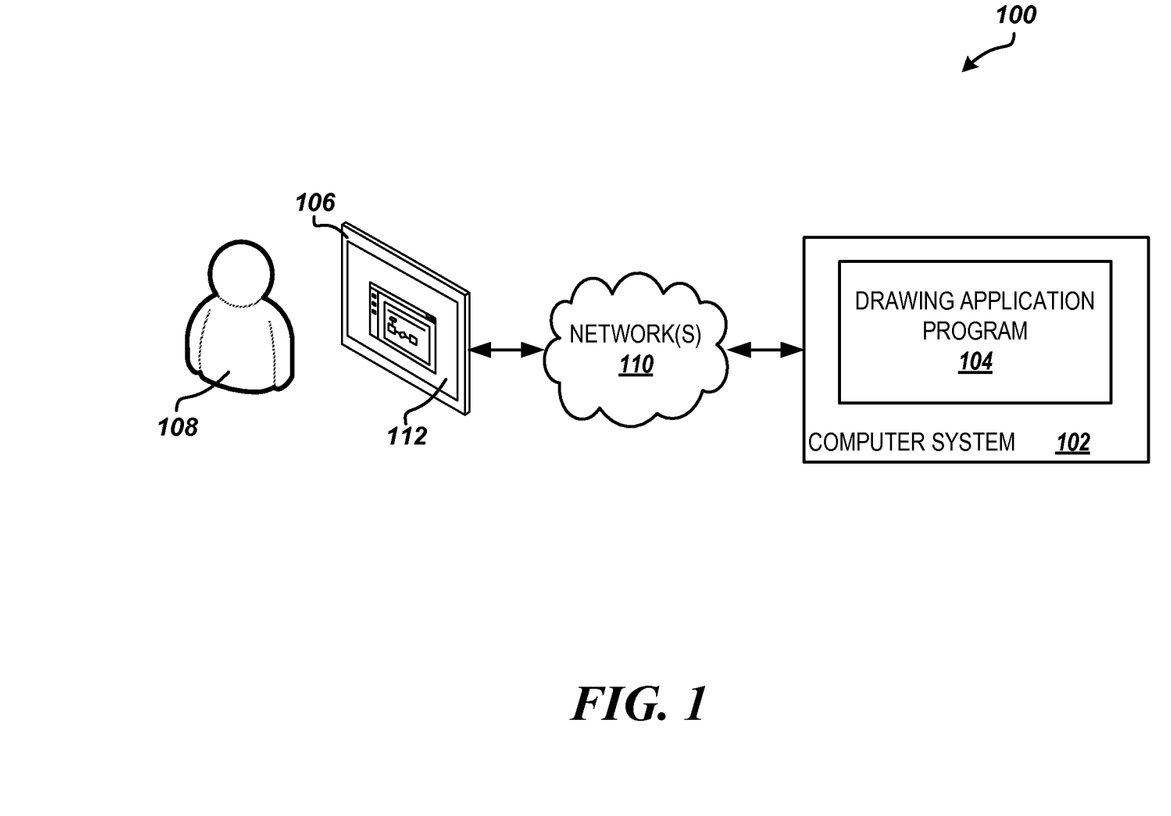
FIG. 1 is a block diagram showing aspects of an illustrative operating environment and software components provided by the embodiments presented herein.

FIG. 1 shows an illustrative operating environment 100 including software components for utilizing drawing guides in determining the display of smart guides in a drawing program, according to embodiments provided herein. The environment 100 includes a computer system 102. The computer system 102 may represent a cloud-based computing platform comprising application servers, Web servers, data storage systems, network appliances, dedicated hardware devices, and/or other server computers or computing devices known in the art. Alternatively, the computer system 102 may represent a user computing device, such as a tablet computing device 106, a personal computer ("PC"), a desktop workstation, a laptop, a notebook, a mobile device, a personal digital assistant ("PDA"), and the like.

According to embodiments, a drawing application program 104 executes in the computer system 102 that allows a user 108 to create visual drawings and/or diagrams through the addition, manipulation, and/or removal of drawing objects, such as lines, shapes, text, images, photographs, and the like, on a drawing surface or "drawing canvas." For example, the drawing application program 104 may be the MICROSOFT® POWERPOINT® presentation application from Microsoft Corp. of Redmond, Wash. In further embodiments, the drawing application program 104 may represent a diagramming application, a presentation application, a publishing application, a web designer application, and the like. In some embodiments, the drawing application program 104 may execute on or more server computers in the computer system 102, such as application servers and/or Web servers. The drawing application program 104 may be accessed by the user 108 using a user computing device, such as the tablet computing device 106, operatively connected to the computer system 102 over one or more networks 110, such as a LANs, WANs, the Internet, or a combination of these and other networking infrastructure known in the art.

The tablet computing device 106 may execute a client application, such as a Web browser application, to access the drawing application program 104 executing in the computer system 102 over the networks 110. In other embodiments, the drawing application program 104 may execute locally on the tablet computing device 106 or other user computing device comprising the computer system 102. The drawing application program 104 may be implemented as hardware, software, or a combination of the two. In addition, the drawing application program 104 may comprise any number of application program modules and other components on the tablet computing device 106, user computing device, the computer system 102, and/or other computing platforms.

Figure 2:
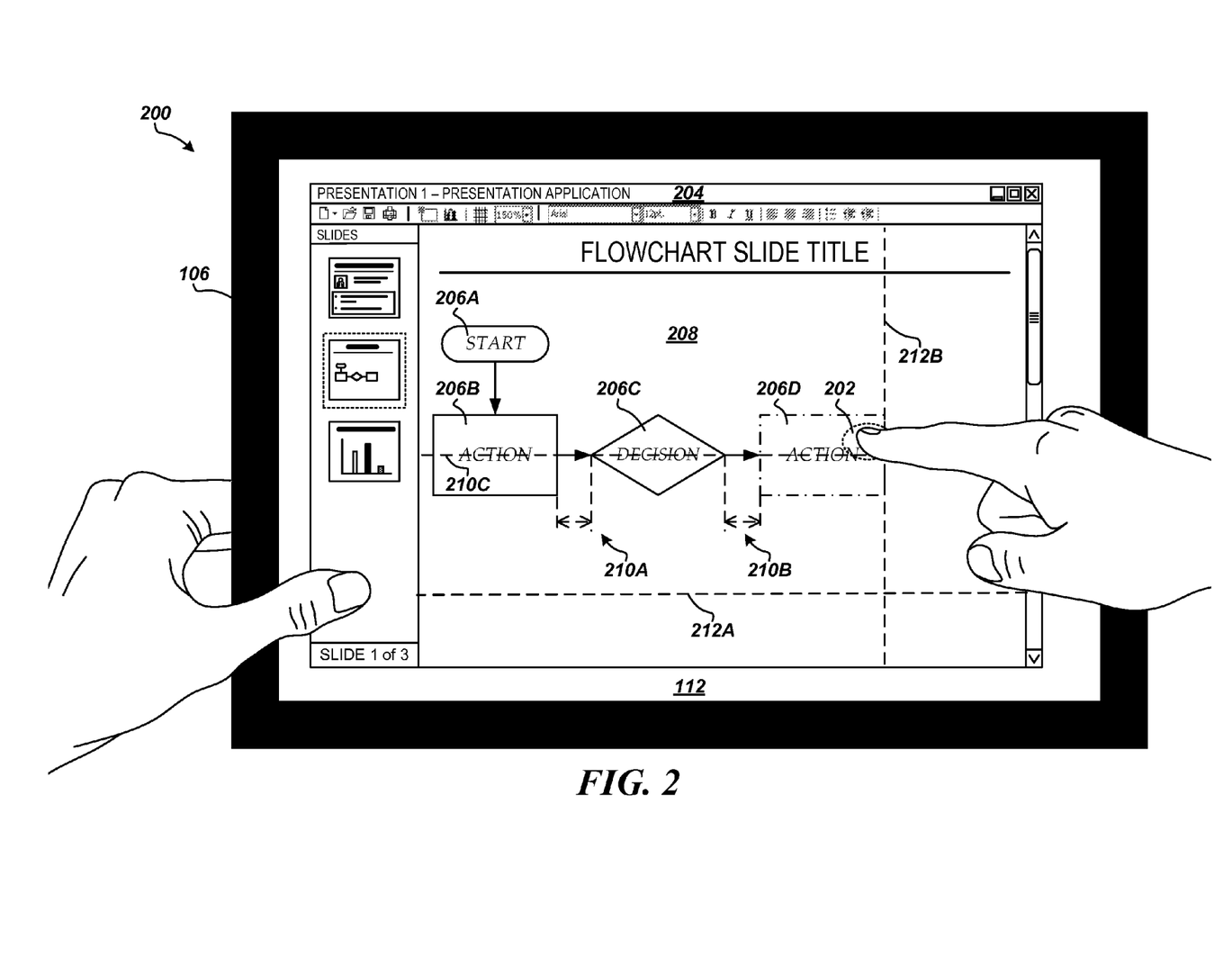
FIG. 2 is a screen diagram showing an illustrative user interface showing the display of drawing guides and smart guides on a drawing canvas, according to embodiments described herein.

The user 108 may interact with the drawing application program 104 through a display and one or more input devices of the tablet device 106 or other user computing device, such as a touchscreen 112 found on the tablet computing device. It will be appreciated that other display and input devices may also be utilized by the user 108 to interact with the drawing application program 104, such as a conventional monitor, television display, keyboard, mouse, game controller, and the like. FIG. 2 shows an example of an illustrative user interface 200 displayed by the drawing application program 104 on the touchscreen 112 of the tablet computing device 106, for example. The user 108 may interact with the user interface 200 by touching elements in the user interface on the touchscreen 112, as shown at 202, to perform the user operations described herein.

The user interface 200 includes a window 204 in which a number of drawing objects 206A-206E (referred to herein generally as drawing object 206 or drawing objects 206) are shown on a drawing canvas 208. The drawing objects 206 may include shapes, connectors, images, text, photographs, media objects, lines, and any other graphical elements known in the art. The drawing objects 206 may be arranged and manipulated on the drawing canvas 208 by the user 108 using the touchscreen 112. For example, the user 108 may utilize the touchscreen 112 to select a drawing object 206D on the drawing canvas 208 to "manipulate," e.g. to place, align, resize, reposition, and the like. A drawing object 206 being manipulated on the drawing canvas 208 by the user 108 in this manner may be referred to herein as the "active object." The active object may be indicated in the user interface 200 by the drawing application program 104 by altering one or more visual properties of the drawing object, such as by changing the color and/or character of a border of the drawing object, as shown at drawing object 206D in FIG. 2.

According to some embodiments, when the active object, such as drawing object 206D, is being manipulated on the drawing canvas 208, the drawing application program 104 may show a number of smart guides 210A-210C (referred to herein generally as smart guide 210 or smart guides 210) on the canvas. For example, equal spacing smart guides, such as smart guides 210A and 210B, may be shown when the spacing between the active drawing object 206D and one or more other drawing objects 206 on the drawing canvas becomes substantially equal to the spacing between other, relevant objects on the drawing canvas. The relevant drawing objects 206 between which to show equal spacing smart guides 210 may he determined by a number of algorithms, including that described in co-pending U.S. patent application Ser. No. 13/220,725 tiled Aug. 30, 2011 and entitled "Determining the Display of Equal Spacing Guides Between Diagram Shapes" (referred to herein as "Equal Spacing Guide application"), which is incorporated herein by this reference in its entirety.

As shown in FIG. 2, the equal spacing smart guides 210B and 210A may be shown between the active drawing object 206D and drawing object 206C and between drawing object 206C and drawing object 206B, respectively, when the horizontal distance between drawing objects 206D and 206C and between drawing objects 206B and 206C becomes equal during repositioning or resizing of the active drawing object 206D, for example. In addition, the active drawing object 206D may snap to this position of equidistant spacing while being dragged across the drawing canvas 208, and the equal spacing smart guides 210A and 210B may be shown as long as the active drawing object 206D remains in this position.

Similarly, alignment smart guides, such as alignment smart guide 210C, may be shown when the active drawing object 206D is placed or moved into a position of relative alignment with one or more other relevant drawing objects 206 on the drawing canvas 208. For example, the alignment smart guide 210C may be shown through the active drawing object 206D and drawing objects 206B and 206C when the centers of the drawing objects become aligned, as further shown in FIG. 2. In addition, the active drawing object 206D may snap to this position of alignment while being dragged across the drawing canvas 208, and the alignment smart guide 210C may be shown as long as the active drawing object 206D remains in this position.

The drawing application program 104 may further show a number of drawing guides 212A-212B (referred to herein generally as drawing guide 212 or drawing guides 212) on the drawing canvas 208. In some embodiments, the drawing guides 212 may comprise one or more non-printing vertical or horizontal lines that are used as visual references for the positioning of drawing objects 206 on the drawing canvas

208. In addition, the drawing application program 104 may cause the active drawing object to snap an edge to a drawing guide 212 visible on the drawing canvas 208 when the active object is dragged within a few pixels of the drawing guide, as shown in FIG. 2 at drawing object 206D and vertical drawing guide 212B.

Some drawings guides 212 may be placed and positioned on the drawing canvas by the user 108. Other drawing guides may be "inherited" from a template, theme, slide master, base drawing canvas, and the like. In some embodiments, inherited drawing guides may not be repositioned or removed by the user 108. In additional embodiments, the drawing canvas 208 may include multiple horizontal and/or vertical drawing guides, beyond the single horizontal drawing guide 212A and vertical drawing guide 212B shown in FIG. 2.

Figure 3:
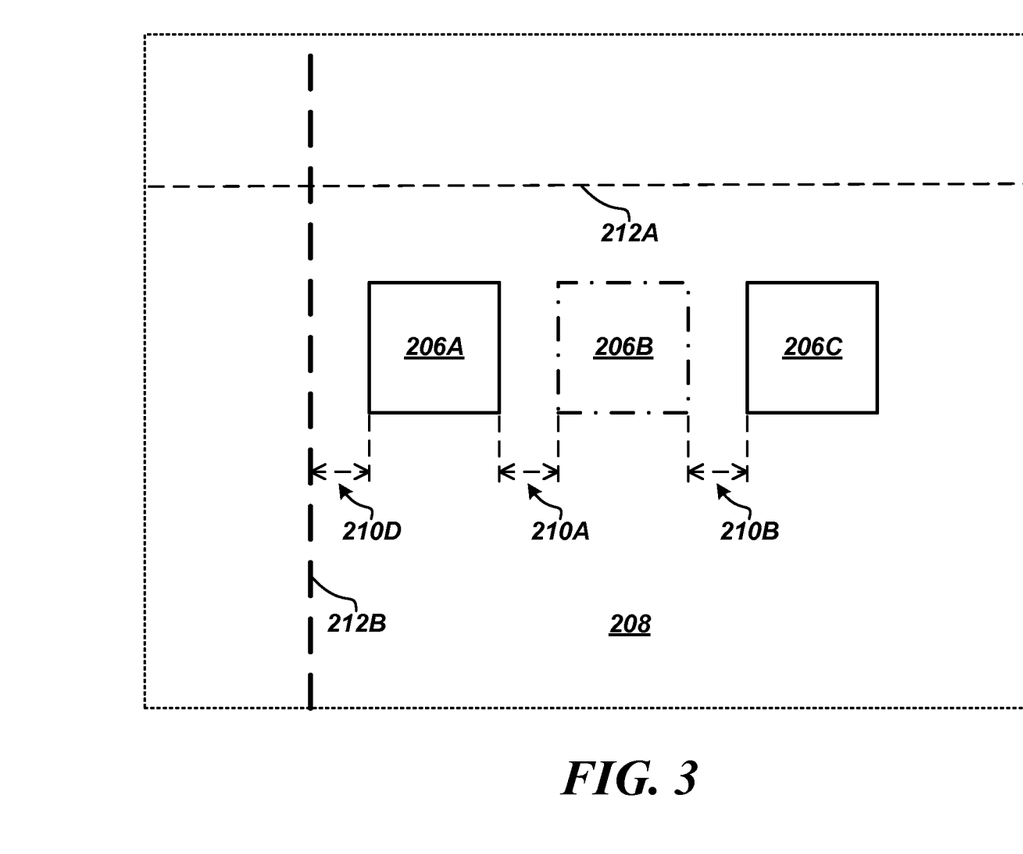
FIG. 3 is a block diagram showing equal spacing smart guides displayed between a drawing guide and a drawing object on a drawing canvas, according to embodiments described herein.

As discussed above, a traditional drawing application may only show smart guides 210 on the drawing canvas between the various drawing objects 206 and independent of any drawing guides 212 that may exist on the drawing canvas. According to embodiments, when determining the relevant drawing objects 206 between which to show equal spacing smart guides 210 and the snap-to positioning of the active drawing object 206D to a position of equidistant spacing, the drawing application program 104 may treat drawing guides 212 visible on the drawing canvas 208 as drawing objects, resulting in equal spacing smart guides being shown between relevant objects and one or more drawing guides, as shown in FIG. 3.

For example, as active drawing object 206B is being manipulated on the drawing canvas 208 by the user 108, if the horizontal distance between drawing object 206A and the active drawing object 206B becomes equal to the horizontal distance between the active drawing object 206B and drawing object 206C, the drawing application program 104 may show equal spacing smart guides 210A and 210B between drawing object 206A and the active drawing object 206B and between the active drawing object 206B and drawing object 206C, respectively. In addition, if the horizontal distance between object 206A and vertical drawing guide 212B is equal to the horizontal spacing between the active drawing object 206B and drawing objects 206A and/or 206C, the drawing application program 104 may show an additional equal spacing smart guide 210D between the drawing object 206A and the vertical drawing guide 212B, as shown in FIG. 3. According to additional embodiments, when a drawing guide, such as vertical drawing guide 212B, is treated as a relevant drawing object for the display of smart guides 210, the drawing application program may further indicate those drawing guides 212 being treated as relevant drawing objects by altering one or more visual properties of the drawing guide, such as by changing the color and/or character of the line representing the drawing guide, as further shown in FIG. 3.

Figure 4:
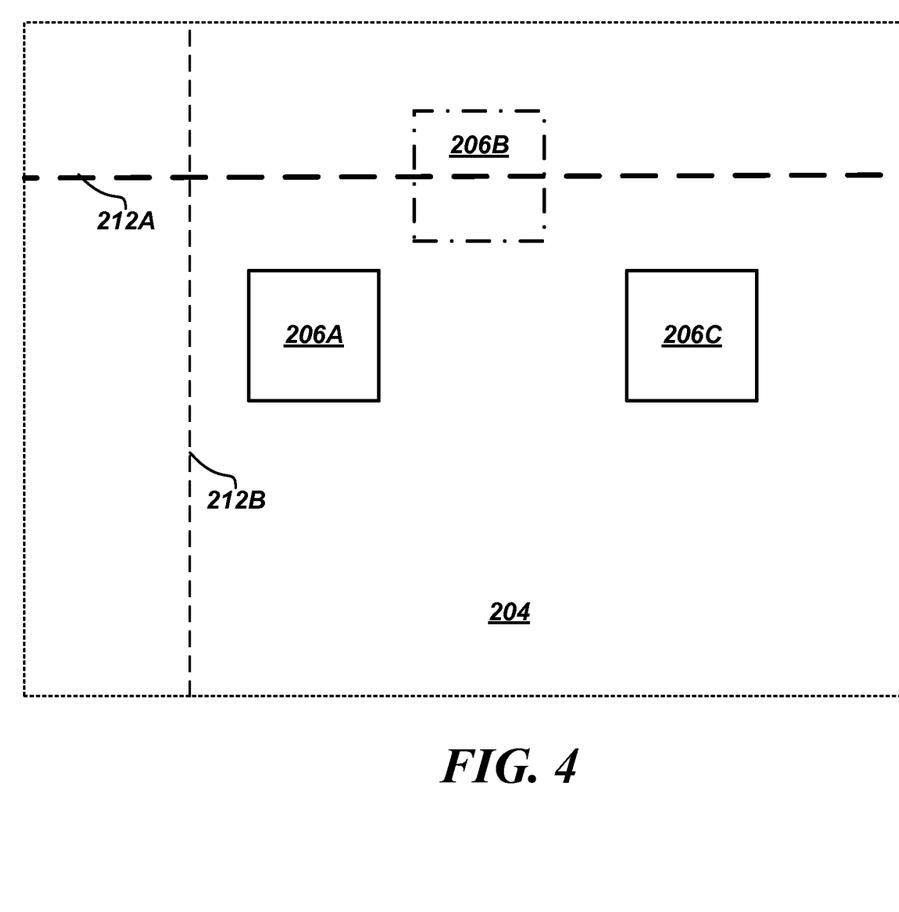
FIG. 4 is a block diagram showing a drawing object snapping to a center placement on a drawing guide, according to embodiments described herein.

According to further embodiments, drawing guides 212 existing and/or visible on the drawing canvas 208 may also be treated as drawing objects by the drawing application program 104 for the display of alignment smart guides 210 and for snap-to positioning of the active drawing object 206B to a position of alignment, as shown in FIG. 4. For example, as active drawing object 206B is being manipulated on the drawing canvas 208 by the user 108, if the center of the active drawing object 206B approaches alignment with the horizontal drawing guide 212A, the drawing application program 104 may snap the active object to center alignment with the drawing guide, as shown in FIG. 4, and display an alignment smart guide 210 indicating the alignment. According to some embodiments, displaying the alignment smart guide 210 in this instance may comprise altering one or more visual properties of the horizontal drawing guide 212A, such as by changing the color and/or character of the line representing the drawing guide, as further shown in FIG. 4. In further embodiments, the drawing application program 104 may overlay the active drawing object 206B and the drawing guide 212A with the display of an alignment smart guide 210C to indicate alignment of the active drawing object with the drawing guide.

It will be appreciated by one skilled in the art that the feature of "edge-snapping" a drawing object to a drawing guide, as is known in the art, is distinct from the feature of snap-to positioning of the active drawing object 206B to alignment smart guides 210C when drawing objects 206 and drawing guides 212 become aligned while the active drawing object 206B is manipulated on the drawing canvas 208, as described by the embodiments herein. In addition, the edge-snapping feature and snap-to alignment smart guide positioning feature may both exist independently in the drawing application program 104 and be separately disabled or enabled by the user 108, for example.

Figure 5:
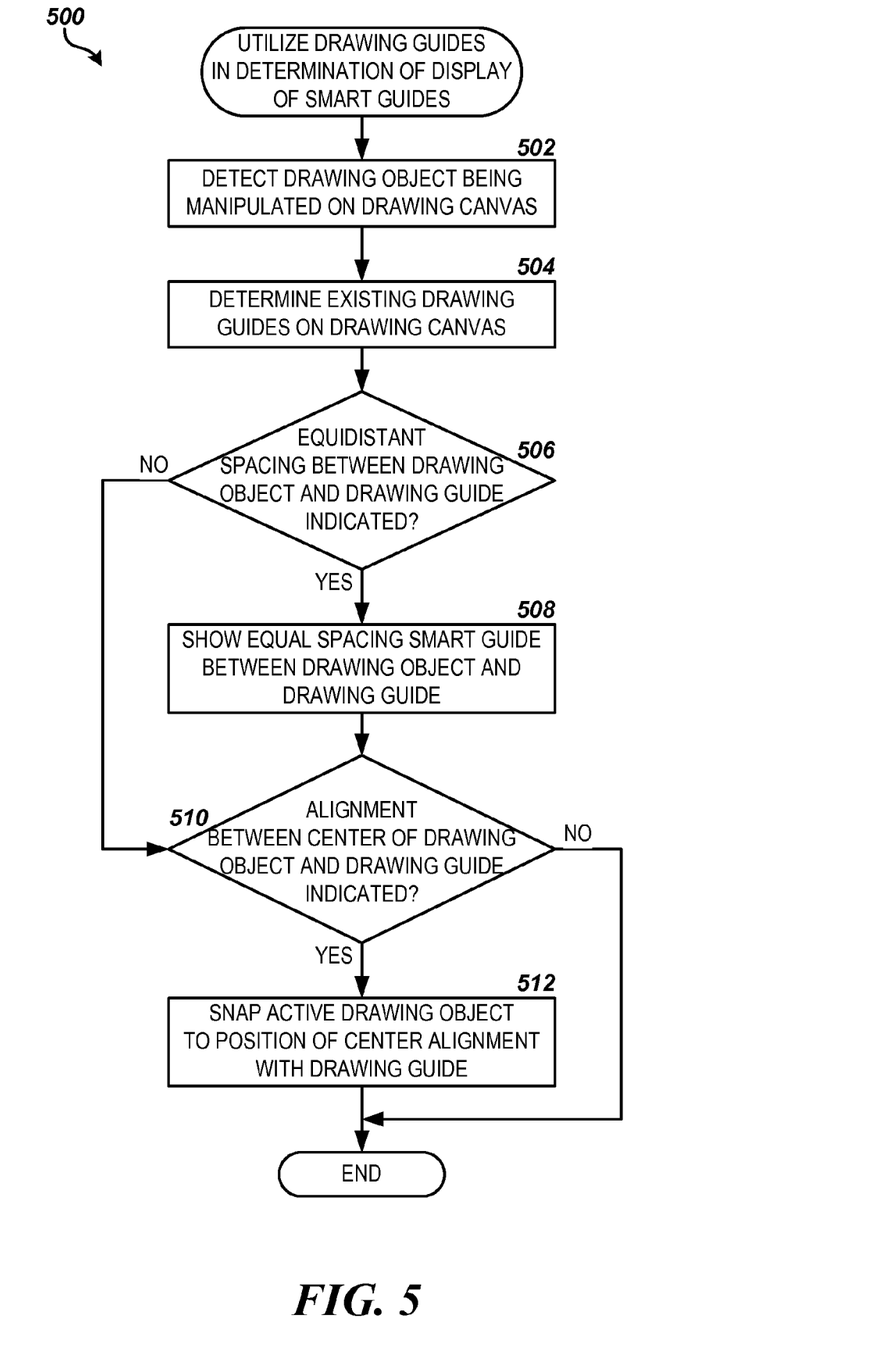
FIG. 5 is a flow diagram showing one method for utilizing drawing guides in determining the display of smart guides in a drawing program, according to embodiments described herein.

Referring now to FIG. 5, additional details will be provided regarding the embodiments presented herein. It will be appreciated that the logical operations described with respect to FIG. 5 may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It will also he appreciated that more or fewer operations may be performed than shown in the figures and described herein. The operations may also be performed in a different order than described.

FIG. 5 illustrates one routine 500 for utilizing drawing guides 212 in determining the display of smart guides 210 in a drawing program, according to one embodiment. The routine 500 may be performed by the drawing application program 104 when an active drawing object 206B is being manipulated on the drawing canvas 208, for example. It will be appreciated that the routine 500 may also be performed by other modules or components executing on other computing devices, or by any combination of modules, components, and computing devices. For purposes of illustration only, the routine 500 is described below with reference to FIGS. 3 and 4 included herein. The routine 500 begins at operation 502, where the drawing application program 104 detects that a drawing object, i.e. the active drawing object 206B, is being manipulated on the drawing canvas 208. As described above in regard to FIG. 2, drawing objects 206 may be placed, repositioned, resized, or otherwise manipulated on the drawing canvas 208 by the user 108 using the touchscreen 112, for example.

From operation 502, the routine 500 proceeds to operation 504, where the drawing application program 104 determines those drawing guides 212A, 212B that exist and/or are visible on the drawing canvas 208. As further described above, multiple horizontal and vertical drawing guides 212 may be placed and positioned on the drawing canvas 208 by the user 108 and/or inherited from a template, theme, slide master, base drawing canvas, and the like. In some embodiments, drawing guides 212 that exist on the drawing canvas 208 but not visible, such as hidden drawing guides inherited from a slide master, may not be treated as drawing objects by the drawing application program 104 for determining the display of smart guides 210.

The routine 500 proceeds from operation 504 to operation 506, where the drawing application program 104 determines whether equidistant spacing is indicated between the active drawing object 206B or a relevant drawing object and a drawing guide 212 on the drawing canvas 208. This determination may he done utilizing any number of algorithms for determining relevant drawing objects 206 between which to display equal spacing smart guides 210A, 210B while the active drawing object 206B is being manipulated on the drawing canvas 208. For example, as described in the Equal Spacing Guide application, as the drawing application program 104 is determining the nearest neighbors for each drawing object 206 on the drawing canvas 208 for the purposes of calculating distances between objects and their nearest neighbors, the drawing application program may treat a visible vertical drawing guide 212B as a drawing object of infinite height and negligible width, for example. In further embodiments, the vertical drawing guide 212B may be treated like a drawing object 206 except that it may not block other drawing objects from being deemed nearest neighbors to the relevant drawing object. In some embodiments, the drawing application program 104 may snap the active drawing object 206B to a position where equidistant spacing is indicated, for example.

If it is determined that equidistant spacing between a drawing object 206 and a drawing guide 212 on the drawing canvas 208 is indicated, then the routine 500 proceeds from operation 506 to operation 508, where the drawing application program 104 displays an equal spacing smart guide 210 between the relevant drawing object 206 and the drawing guide 212. For example, the drawing application program 104 may display an equal spacing smart guide 210D between drawing object 206A and the vertical drawing guide 212B if the horizontal distance between drawing object 206A and the vertical drawing guide 212B becomes equal to the horizontal distance between the active drawing object 206B and drawing object 206A and/or drawing object 206C, as shown in FIG. 3. In additional embodiments, the drawing application program 104 may further indicate that the vertical drawing guide 212B is being treated as a relevant drawing object by altering one or more visual properties of the drawing guide, such as by changing the color and/or character of the line representing the drawing guide, as further shown in FIG. 3.

If at operation 506 it is determined that equidistant spacing between a drawing object 206 and a drawing guide 212 is not indicated, then the routine 500 skips operation 508 and proceeds to operation 510, where the drawing application program 104 determines whether alignment between the center of the active drawing object 206B, a drawing guide 212, and potentially one or more other drawing objects 206 on the drawing canvas is indicated. This determination may be done utilizing any number of algorithms for determining alignment of drawing objects known in the art. For example, if the active drawing object 206B is dragged across the drawing canvas 208 such that the vertical center of the drawing object is within a few pixels of the horizontal drawing guide 212A, as shown in FIG. 4, then the alignment between the center of the drawing object and the horizontal drawing guide is indicated.

If it is determined that alignment between the center of the active drawing object 206B and a drawing guide 212 is indicated, then the routine 500 proceeds from operation 510 to operation 512, where the drawing application program 104 snaps the active drawing object 206B to a position of center alignment of the object with the drawing guide 212. For example, the drawing application program may snap the active drawing object 206B to a position where the object is centrally aligned with the horizontal drawing guide 212A, as shown in FIG. 4. In further embodiments, the application drawing program 104 may also display an alignment smart guide 210C between the active drawing object 206B and the aligned drawing guide 212. As further described above in regard to FIG. 4, displaying the alignment smart guide 210C in this instance may comprise altering one or more visual properties of the horizontal drawing guide 212A, such as by changing the color and/or character of the line representing the drawing guide. Alternatively, the drawing application program 104 may overlay the active drawing object 206B and the horizontal drawing guide 212A with the display of an alignment smart guide 210C to indicate alignment of the active drawing object with the drawing guide. From operation 512, the routine 500 ends.

Figure 6:
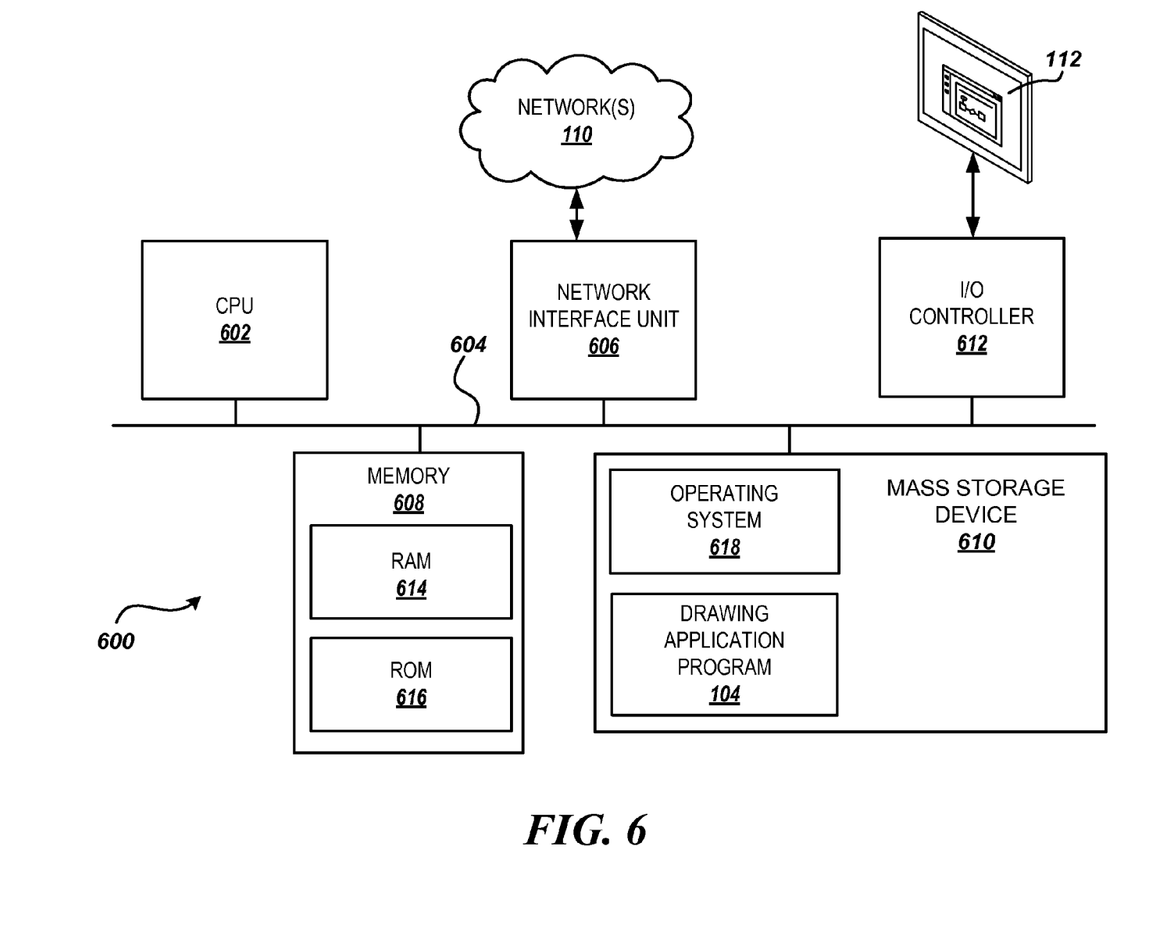
FIG. 6 is a block diagram showing an illustrative computer hardware architecture for a computing system capable of implementing aspects of the embodiments presented herein.

FIG. 6 shows an example computer architecture for a computer 600 capable of executing the software components described herein for utilizing drawing guides in determining the display of smart guides in a drawing program, in the manner presented above. The computer 600 shown in FIG. 6 illustrates a conventional desktop computer, laptop, notebook, PDA, wireless phone, server computer, or other computer or computing device. The computer 600 in can he used to provide the functionality described herein with respect to the computer system 102, the tablet computing device 106, and/or any other computer or computing device. The computer 600 thus may be utilized to execute any aspects of the software components presented herein.

The computer 600 shown in FIG. 6 includes one or more central processing units ("CPUs") 602. The CPUs 602 may be standard processors that perform the arithmetic and logical operations necessary for the operation of the computer. The CPUs 602 perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 608, including a random access memory ("RAM") 614 and a read-only memory 616 ("ROM"), and a system bus 604 that couples the memory to the CPUs 602. A basic input/output system containing the basic routines that help to transfer information between elements within the computer 600, such as during startup, is stored in the ROM 616. The computer 600 also includes a mass storage device 610 for storing an operating system 618, application programs, and other program modules, which are described in greater detail herein.

The mass storage device 610 is connected to the CPUs 602 through a mass storage controller (not shown) connected to the bus 604. The mass storage device 610 provides non-volatile storage for the computer 600. The computer 600 may store information on the mass storage device 610 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 600 may store information to the mass storage device 610 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 600 may further read information from the mass storage device 610 by detecting the physical states or characteristics of one or more particular locations within the mass storage device.

As mentioned briefly above, a number of program modules and data files may be stored in the mass storage device 610 and RAM 614 of the computer 600, including an operating system 618 suitable for controlling the operation of a computer. The mass storage device 610 and RAM 614 may also store one or more program modules. In particular, the mass storage device 610 and the RAM 614 may store the drawing application program 104, which was described in detail above in regard to FIG. 1. The mass storage device 610 and the RAM 614 may also store other types of program modules or data.

In addition to the mass storage device 610 described above, the computer 600 may have access to other computer-readable media to store and retrieve information, such as program modules, data structures, or other data. It will be appreciated by those skilled in the art that computer-readable media may be any available media that can be accessed by the computer 600, including computer-readable storage media and communications media. Communications media includes transitory signals. Computer-readable storage media includes volatile and non-volatile, removable and non-removable media implemented in any method or technology for the non-transitory storage of information, such as computer-executable instructions, data structures, program modules, or other data. For example, computer-readable storage media includes, but is not limited to, RAM, ROM, EPROM. EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can he used to store the desired information and that can be accessed by the computer 600.

The computer-readable storage medium may be encoded with computer-executable instructions that, when loaded into the computer 600, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 600 by specifying how the CPUs 602 transition between states, as described above. According to one embodiment, the computer 600 may have access to computer-readable storage media storing computer-executable instructions that, when executed by the computer, perform the routine 500 for utilizing drawing guides in determining the display of smart guides in a drawing program, described above in regard to FIG. 5.

According to various embodiments, the computer 600 may operate in a networked environment using logical connections to remote computing devices and computer systems through the network(s) 110 described above in regard to FIG. 1 and/or other networks, such as a LAN, a WAN, the Internet, or a network of any topology known in the art. The computer 600 may connect to the network 620 through a network interface unit 606 connected to the bus 604. It will be appreciated that the network interface unit 606 may also be utilized to connect to other types of networks and remote computer systems.

The computer 600 may also include an input/output controller 612 for receiving and processing input from a number of input devices, including the touchscreen 112 described above, a keyboard, a mouse, a touchpad, an electronic stylus, or other type of input device. Similarly, the input/output controller 612 may provide output to a display device, such as the touchscreen 112, a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Figure 7:
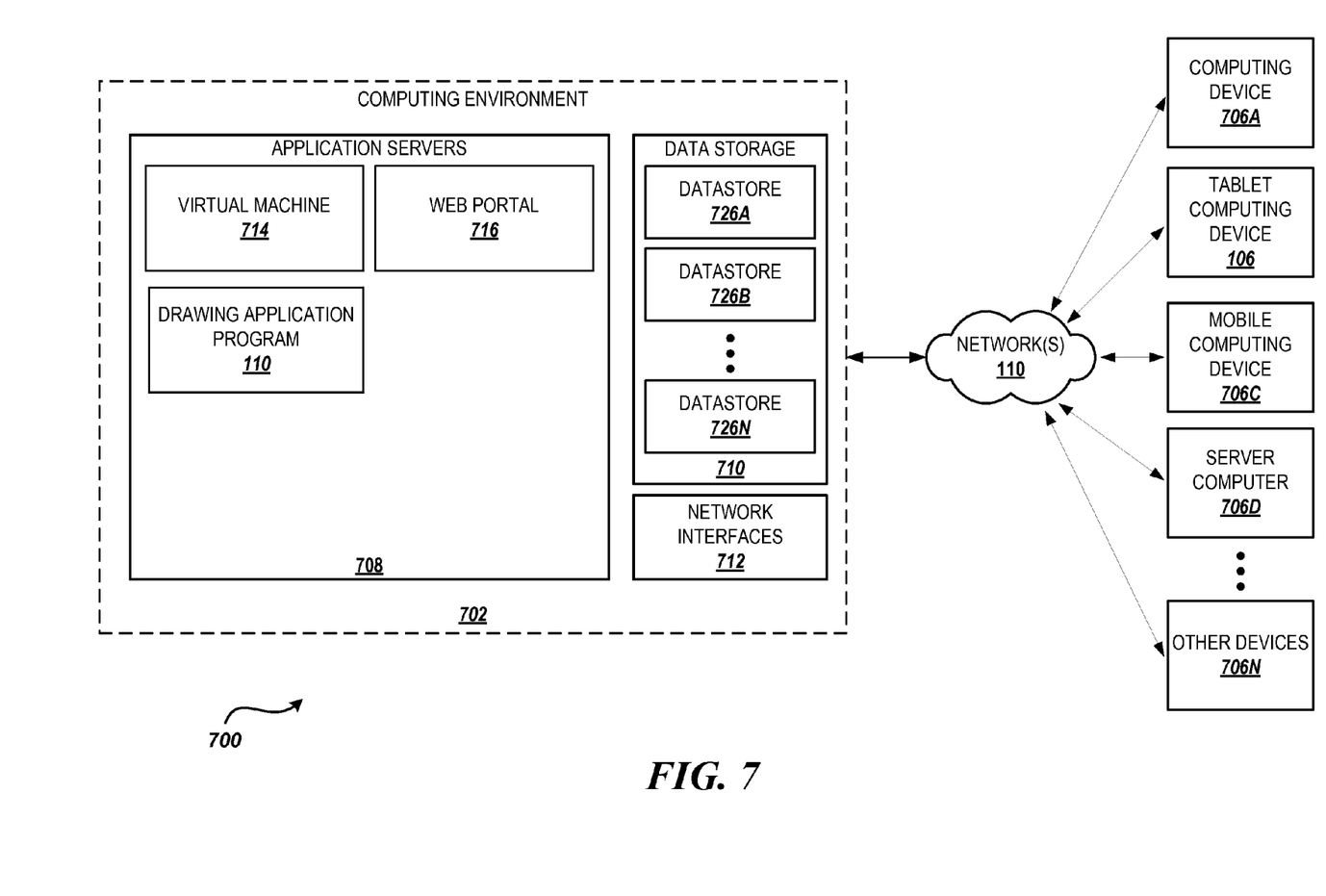
FIG. 7 is a block diagram illustrating a distributed computing environment capable of implementing aspects of the embodiments presented herein.

FIG. 7 illustrates an illustrative distributed computing environment 700 capable of executing the software components described herein for utilizing drawing guides in determining the display of smart guides in a drawing program, in the manner presented above. The distributed computing environment 700 illustrated in FIG. 7 can be used to provide the functionality described herein with respect to the computer system 102 and/or any other computing devices. The distributed computing environment 700 thus may be utilized to execute any aspects of the software components presented herein.

According to various implementations, the distributed computing environment 700 includes a computing environment 702 operating on, in communication with, or as part of the network(s) 110. The network(s) may include various access networks. One or more client devices 706A-706N (hereinafter referred to collectively and/or generically as "clients 706") can communicate with the computing environment 702 via the network(s) 110 and/or other connections (not illustrated in FIG. 7). In the illustrated embodiment, the clients 706 include a computing device 706A such as a laptop computer, a desktop computer, or other computing device; the tablet computing device 106 described above in regard to FIG. 1; a mobile computing device 706C such as a mobile telephone, a smart phone, or other mobile computing device; a server computer 706D; and/or other devices 706N. It will be understood that any number of clients 706 can communicate with the computing environment 702. It will be understood that the illustrated clients 706 and computing architectures illustrated and described herein are illustrative, and should not be construed as being limited in any way.

In the illustrated embodiment, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated embodiment, the application servers 708 host one or more virtual machines 714 for hosting applications or other functionality. According to various implementations, the virtual machines 714 host one or more applications and/or software modules for providing the functionality described herein. It will be understood that this embodiment is illustrative, and should not be construed as being limiting in any way.

The application servers 708 may also host or provide access to one or more Web portals, link pages, Web sites, and/or other information ("Web portals") 716.

As shown in FIG. 7, the application servers 708 also can host other services, applications, portals, and/or other resources. For example, the application servers 708 may host the drawing application program 104, which was described in detail above in regard to FIG. 1. As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data.

The computing environment 702 can communicate with, or be accessed by, the network interfaces 712. The network interfaces 712 can include various types of network hardware and software for supporting communications between two or more computing devices including, but not limited to, the clients 706 and the application servers 708. It will be appreciated that the network interfaces 712 also may be utilized to connect to other types of networks and/or computer systems.

It will be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts arid technologies disclosed herein, the distributed computing environment 700 provides the software functionality described herein as a service to the clients 706. It will be understood that the clients 706 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 700 to utilize the functionality described herein for utilizing drawing guides in determining the display of smart guides.

Based on the foregoing, it will be appreciated that technologies for utilizing drawing guides in determining the display of smart guides in a drawing program are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for utilizing drawing guides in determining the display of smart guides on a drawing canvas, the method comprising executing instructions in a computer system to perform the operations of:
    detecting an active drawing object being manipulated on the drawing canvas;
    determining that a drawing guide has been placed on the drawing canvas by a user or has been inherited from a template or slide master; and
    generating an equal spacing smart guide by
        treating the drawing guide as a drawing object,
        determining a spacing between the drawing guide and a first drawing object on the drawing canvas,
        determining whether the spacing between the drawing guide and the first drawing object on the drawing canvas is substantially equal to spacing between relevant drawing objects on the drawing canvas, and
        upon determining that the spacing between the drawing guide and the first drawing object is substantially equal to the spacing between the relevant drawing objects, displaying the equal spacing smart guide on the drawing canvas between the drawing guide and the first drawing object and snapping the active drawing object to a position of equidistant spacing relative to the spacing between the drawing guide and the first drawing object.

2. The computer-implemented method of claim 1, wherein the first drawing object is the active drawing object.

3. The computer-implemented method of claim 1, further comprising, upon displaying the equal spacing smart guide between the drawing guide and the first drawing object, altering one or more visual properties of the drawing guide.

4. The computer-implemented method of claim 3, wherein altering the one or more visual properties of the drawing guide comprises changing a color or a character of a border of the drawing object.

5. An optical disk, a magnetic storage device, or a solid state storage device comprising computer-executable instructions that, when executed in a computer system, cause the computer system to:
    detect an active drawing object being manipulated on a drawing canvas;
    determine that a drawing guide has been placed on the drawing canvas by a user or has been inherited from a template or slide master; and
    generate an equal spacing smart guide by
        treating the drawing guide as a drawing object,
        determining a spacing between the drawing guide and a first drawing object on the drawing canvas,
        determining whether the spacing between the drawing guide and the first drawing object on the drawing canvas is substantially equal to a spacing between relevant drawing objects on the drawing canvas, and
        upon determining that the spacing between the drawing guide and the first drawing object is substantially equal to the spacing between the relevant drawing objects, displaying the equal spacing smart guide on the drawing canvas between the drawing guide and the first drawing object and snapping the active drawing object to a position of equidistant spacing relative to the spacing between the drawing guide and the first drawing object.

6. The optical disk, the magnetic storage device, or the solid state storage device of claim 5, encoded with further computer-executable instructions that cause the computer to:
    upon determining that spacing between the drawing guide and the first drawing object is substantially equal to the spacing between the relevant drawing objects, alter one or more visual properties of the drawing guide.

7. The optical disk, the magnetic storage device, or the solid state storage device of claim 6, wherein the computer-executable instructions that cause the computer to alter one or more visual properties of the drawing guide comprise instructions to alter a color or a character of a border of the drawing object.

8. The optical disk, the magnetic storage device, or the solid state storage device of claim 5, wherein a plurality of drawing guides are visible on the drawing canvas.

9. A system comprising:
one or more processors;
a memory operably coupled to the one or more processors; and
a drawing application program residing in the memory and comprising computer-executable instructions operable to configure the one or more processors to
detect an active drawing object being manipulated on a drawing canvas of the drawing application program,
determine that a drawing guide has been placed on the drawing canvas by a user or has been inherited from a template or slide master, and
generate an equal spacing smart guide by
treating the drawing guide as a drawing object in determining the display of equal spacing smart guides,
determining a spacing between the drawing guide and a first drawing object,
determining whether the spacing between the drawing guide and the first drawing object is substantially equal to spacing between relevant drawing objects on the drawing canvas, and
upon determining that the spacing between the drawing guide and the first drawing object is substantially equal to spacing between relevant drawing objects on the drawing canvas, displaying the equal spacing smart guide on the drawing canvas between the drawing guide and the first drawing object and snapping the active drawing object to a position of equidistant spacing relative to the spacing between the drawing guide and the first drawing object.

10. The system of claim 9, wherein treating the drawing guide as a drawing object in determining the display of the equal spacing smart guides on the drawing canvas further comprises, upon displaying the equal spacing smart guide between the drawing guide and the first drawing object, altering one or more visual properties of the drawing guide.

11. The system of claim 10, wherein altering the one or more visual properties of the drawing guide comprises changing a color or a character of a border of the drawing object.

12. The system of claim 9, wherein the first drawing object is the active drawing object.

13. The system of claim 9, wherein the computer-executable instructions further comprise instructions to:
determine whether alignment between the drawing guide and a center of the active drawing object is indicated; and
upon determining that alignment between the drawing guide and the center of the active drawing object is indicated, snap the active drawing object to a position on the drawing canvas of center alignment with the drawing guide.

14. The system of claim 13, wherein treating the drawing guide as a drawing object in determining the snap-to positioning of the active drawing object further comprises, upon snapping the active drawing object to a position on the drawing canvas of center alignment with the drawing guide, altering one or more visual properties of the drawing guide.

15. The system of claim 14, wherein altering one or more properties of the drawing guide comprises changing a color or a character of a line representing the drawing guide.

* * * * *